（12）United States Patent
Kirknes

(10) Patent No.: US 11,152,698 B2
(45) Date of Patent: Oct. 19, 2021

(54) RETRODIRECTIVE WIRELESS DEVICE AND METHOD

(71) Applicant: Norbit ITS, Trondheim (NO)

(72) Inventor: Steffen Kirknes, Ranheim (NO)

(73) Assignee: Norbit ITS, Trondheim (NO)

( * ) Notice: Subject to any disclaimer, the term of this patent is extended or adjusted under 35 U.S.C. 154(b) by 0 days.

(21) Appl. No.: 16/477,972

(22) PCT Filed: Jan. 17, 2018

(86) PCT No.: PCT/EP2018/051090
§ 371 (c)(1),
(2) Date: Jul. 15, 2019

(87) PCT Pub. No.: WO2018/134241
PCT Pub. Date: Jul. 26, 2018

(65) Prior Publication Data
US 2019/0363438 A1    Nov. 28, 2019

(30) Foreign Application Priority Data
Jan. 17, 2017   (NO) .................................. 20170071

(51) Int. Cl.
*H01Q 3/26*     (2006.01)
*H01Q 23/00*    (2006.01)

(52) U.S. Cl.
CPC .......... *H01Q 3/2647* (2013.01); *H01Q 23/00* (2013.01)

(58) Field of Classification Search
CPC ...... H01Q 3/46; H01Q 3/2647; H01Q 3/2652; H01Q 9/265; H01Q 13/20; H01Q 21/064; H01Q 21/065; G01S 13/756
See application file for complete search history.

(56) References Cited

U.S. PATENT DOCUMENTS 2,908,002 A    10/1959  Van Etta
3,142,837 A *   7/1964  Johnson ................ G01S 13/756
                                                 342/353

(Continued)

FOREIGN PATENT DOCUMENTS

JP        2007-068088 A     3/2007
WO     WO-2013045015 A1     4/2013

OTHER PUBLICATIONS

Vial, Antoine, "International Search Report," prepared for PCT/EP2018/051090, dated Apr. 5, 2018, four pages.

(Continued)

*Primary Examiner* — Tung X Le
(74) *Attorney, Agent, or Firm* — Shackleford, Bowen, McKinley & Norton, LLP

(57) ABSTRACT

Present invention is a wireless device comprising a Van Atta array, said Van Atta array comprising a plurality of antenna pairs, each of said antenna pairs comprising two antenna elements electrically coupled by a signal path of pre-determined length. The wireless device further comprises a measurement unit, said measurement unit is adapted to perform electrical measurements between two measurement points. One of said two measurement points is located at a first pre-determined location on the signal path of one of the antenna pairs, and the other of said two measurement points is located on a second pre-determined location on the signal path of one of the other antenna pairs. The present invention is also a method for retro-reflection of an incident wave using a plurality of antenna pairs.

11 Claims, 7 Drawing Sheets

(56) References Cited

U.S. PATENT DOCUMENTS

Figure 1:
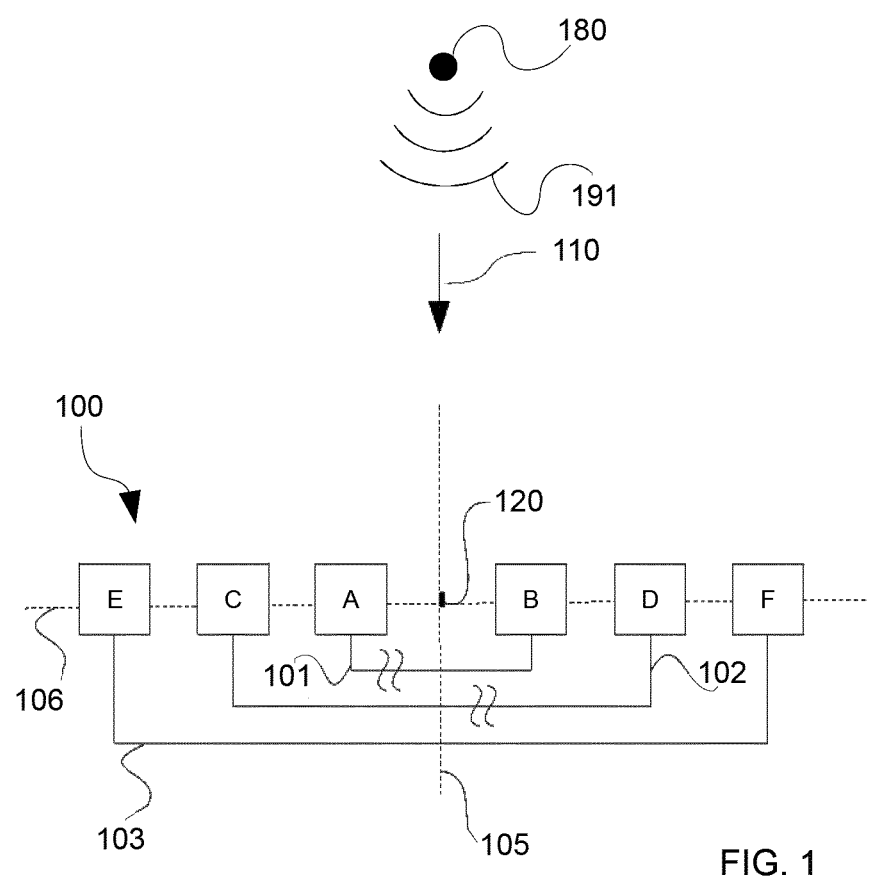

| | | | |
|---|---|---|---|
| 3,496,570 A | 2/1970 | Lewis | |
| 3,731,313 A * | 5/1973 | Nagai | H01Q 3/46 342/370 |
| 3,789,417 A * | 1/1974 | Coleman | H01Q 21/20 343/816 |
| 4,612,548 A * | 9/1986 | Beltran | H01P 5/12 342/373 |
| 4,806,938 A | 2/1989 | Meadows | |
| 5,254,997 A | 10/1993 | Cohn | |
| 5,387,916 A * | 2/1995 | Cohn | G07C 9/28 342/44 |
| 5,945,938 A * | 8/1999 | Chia | G01S 13/756 342/42 |
| 6,657,580 B1 | 12/2003 | Edwards et al. | |
| 2004/0110469 A1 * | 6/2004 | Judd | G01S 19/25 455/15 |
| 2005/0200516 A1 | 9/2005 | Brown | |
| 2010/0117914 A1 * | 5/2010 | Feller | H01Q 1/42 343/757 |
| 2010/0207811 A1 * | 8/2010 | Lackey | G01S 19/35 342/357.44 |
| 2010/0248651 A1 * | 9/2010 | Dent | H01Q 1/246 455/78 |
| 2011/0026624 A1 | 2/2011 | Gummalla et al. | |
| 2011/0195670 A1 | 8/2011 | Dakshinamurthy et al. | |
| 2012/0001735 A1 * | 1/2012 | Fink | G06K 19/0675 340/10.4 |
| 2012/0289338 A1 | 11/2012 | Chen et al. | |
| 2015/0145713 A1 * | 5/2015 | Maddox | G01S 13/751 342/47 |

OTHER PUBLICATIONS

Chung, Shyh-Jong, et al., "A Novel Bi-Directional Amplifier With Applications in Active Van Atta Retrodirective Arrays," IEEE Transactions on Microwave Theory and Techniques, vol. 51, No. 2, Feb. 1, 2003, six pages.

Lai, Chi-Hui, et al., "Tri-Mode Heterogeneous Integrated Beam-Switching/Van Atta/Phase-Conjugating Array Using Synthesized Transmission Lines," IEEE Transactions on Microwave Theory and Techniques, vol. 62, No. 9, Sep. 2014, pp. 2180-2192.

* cited by examiner

RETRODIRECTIVE WIRELESS DEVICE AND METHOD

The present teachings relate generally to system and method for reflecting an electromagnetic wave. More specifically, the present teachings relate to a wireless device adapted to reflect, and preferably reshape, an incident wave in a predetermined direction, and a method thereof.

Vann Atta arrays are widely covered in literature since their introduction. For example, U.S. Pat. No. 2,908,002 filed by Van Atta himself explained how such an array could be used to reflect an incident wave in a predetermined direction. Several improvements of Van Atta arrays or reflectors have subsequently been published. For example, U.S. Pat. No. 3,496,570 proposed means for preventing specular reflection from a Van Atta array, and U.S. Pat. No. 5,945,938 proposed a Van Atta array based transponder which is simple to manufacture at low cost. The Van Atta array reflector has one of the simplest structures for retrodirective arrays. Hence Van Atta array reflector finds application in wireless communications, RF identification ("RFID"), and Intelligent Transportation Systems ("ITSs").

In applications such as Dedicated Short-Range Communications ("DSRCs"), a transponder requires its conversion gain to be within a narrow range as the communication must take place at a set distance. This is also reflected in the associated regulatory requirements.

Applying a Van Atta array, the conversion gain can be increased to a high value, at or close to the maximum limit of conversion gain. However, as each antenna element in the Van Atta array is used both for reception and transmission, its beamwidth will appear twice in the link budget and thus consume a significant part of the available gain range.

U.S. Pat. No. 5,254,997 taught a retrodirective interrogation responsive system wherein a responder modulates information onto an interrogation signal, and retransmits the encoded interrogation signal back in the direction of arrival of the collected interrogation signal. U.S. Pat. No. 5,254,997 also taught using a bilateral modulator such that the interrogation signal is collected by one element of the antenna pair, modulated, and retransmitted out of the other antenna pair element, thereby doubling the number of effective transmitting antenna elements as compared to that with a unilateral modulator. U.S. Pat. No. 6,657,580 taught a transponder comprising a retro-reflective antenna in which the length of the transmission lines was an integer multiple of the wavelength of the retro-reflected signal.

Backscatter transponders applied to DSRC systems are subject to both conversion gain and beam-width requirements. In the case of a passive DSRC transponder the conversion gain is almost solely dependent on the antenna. The gain and beam-width of an antenna are typically inversely proportional to each another, the requirement for favorable conversion gain and beam-width are usually mutually in conflict.

The above-mentioned and other problems inherent to the prior art will be shown solved by the features of the accompanying independent claims.

According to one aspect of the present teachings a system and method for increasing the effective beam-width of the transponder beyond the beam-width of the basic radiating elements can be provided.

From another aspect of the present teachings a device and method for reducing unwanted backscatter emission can be provided.

From yet another aspect of the present teachings a device and method for increasing the effective beamwidth without increasing the unwanted radiation can be provided.

The typical configuration of the Van Atta transponder is a plurality of antenna elements located around a common geometrical center. Symmetrically arranged pairs of antenna elements are interconnected or coupled by appropriate transmissions lines, which are signal paths of given electrical length. The electrical length of the signal paths is usually equal. In addition, the signal length can be a given factor of a wavelength of interest. The given factor is usually an integer. As the signal paths carry electrical signals that propagate in both directions, standing waves are formed along the signal path. Said standing waves are similar to that in an unterminated transmission line.

The present teachings will now be discussed more in detail using the following drawings illustrating the embodiments by way of examples.

FIG. 1 illustrates a simple Van Atta array

Figure 2A:
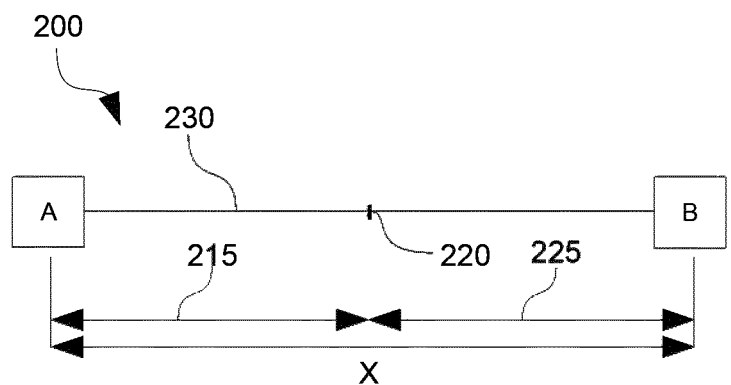
Figure 2B:
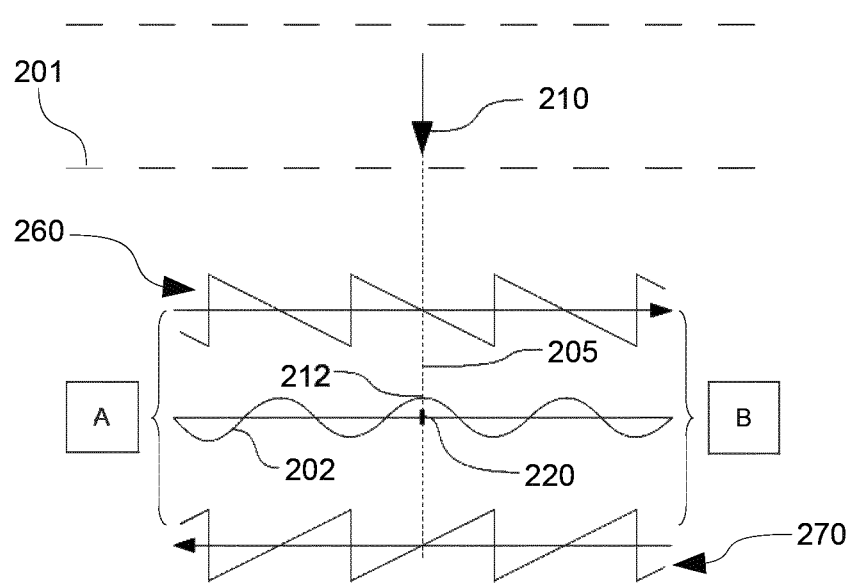
Figure 3:
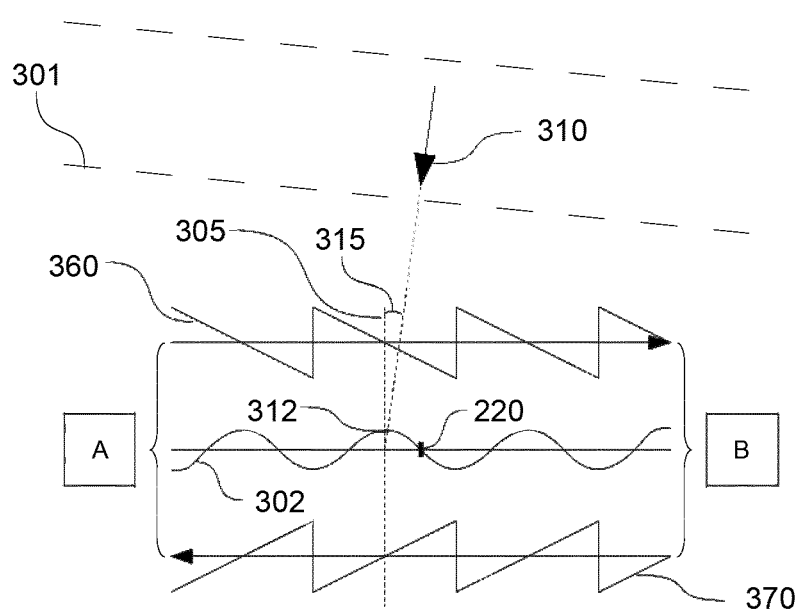
Figure 4:
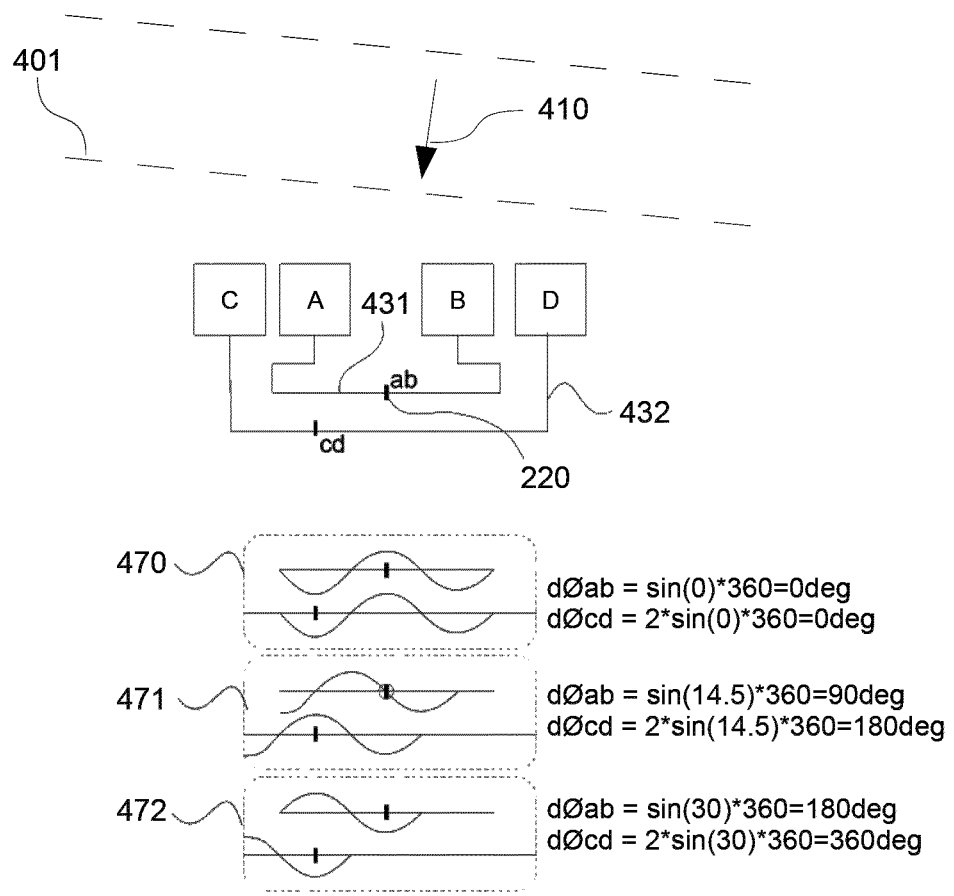
Figure 5:
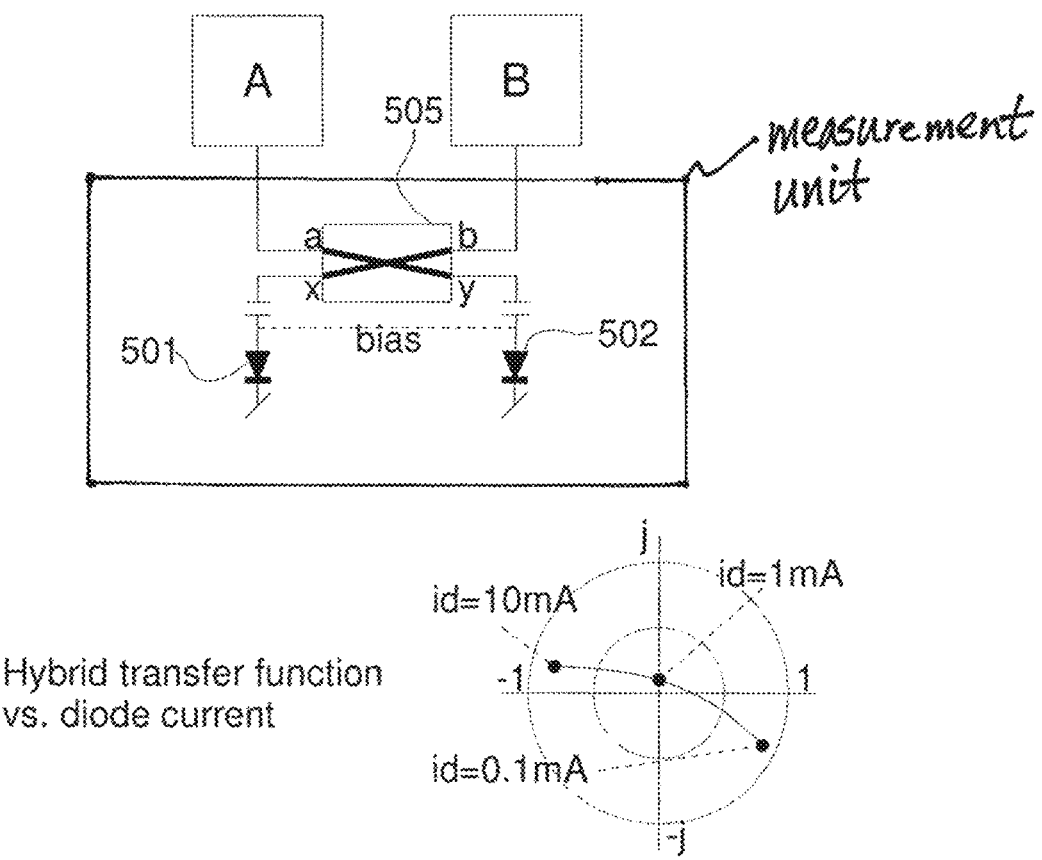
Figure 6:
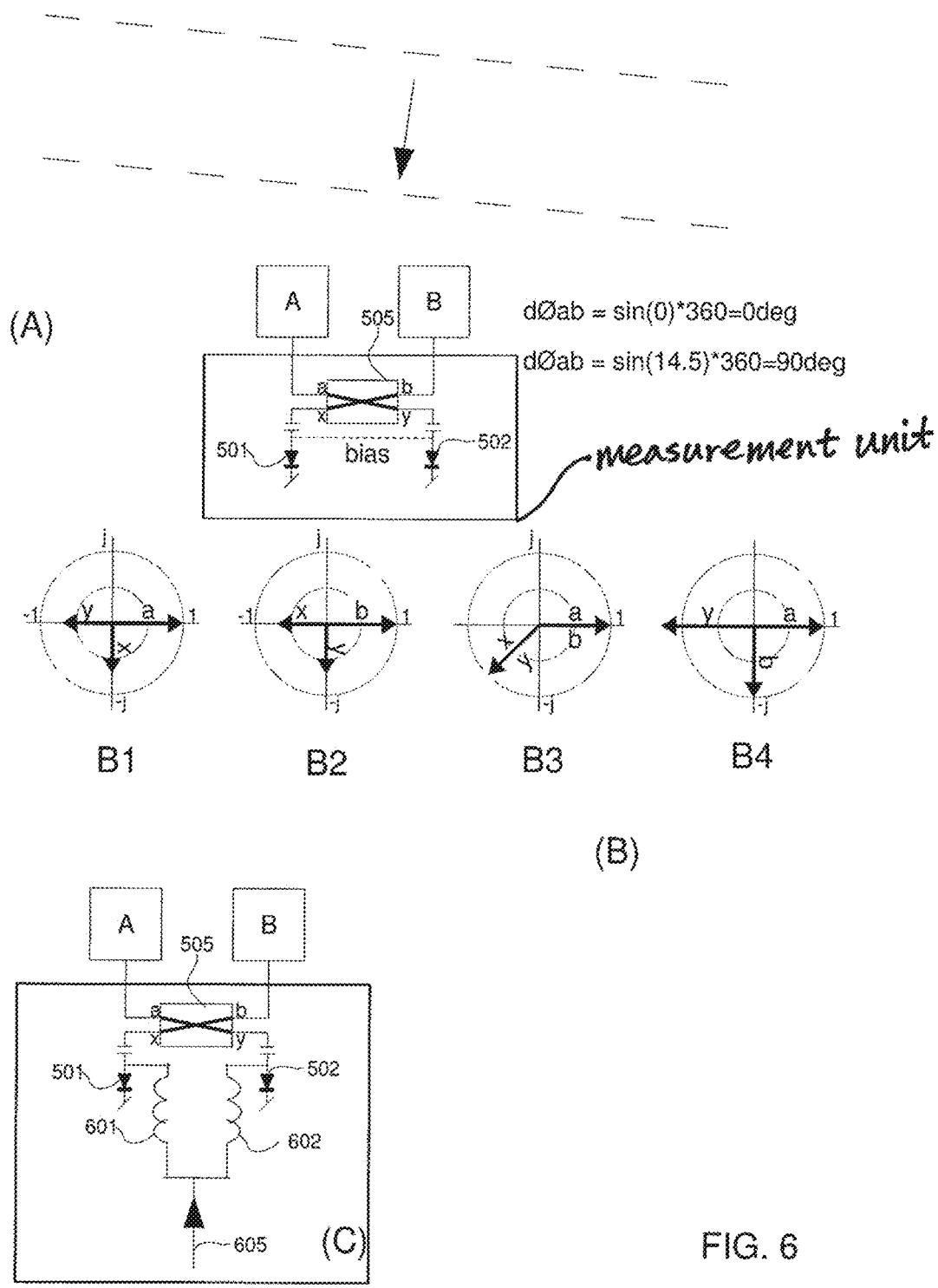
Figure 7:
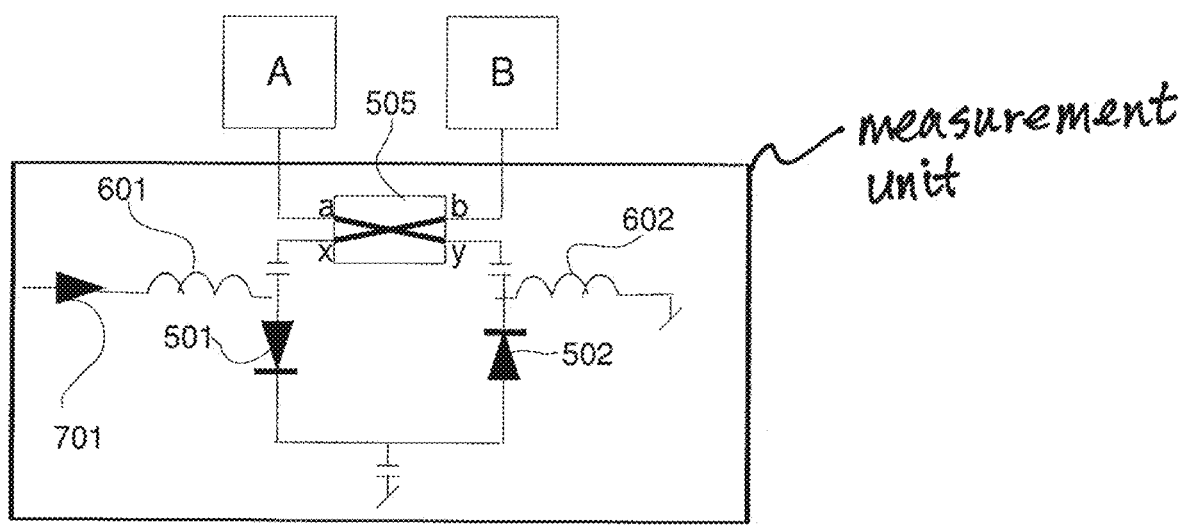

FIG. 2a illustrates a simple antenna arrangement with a single pair of antenna elements FIG. 2b illustrates a formation of a standing wave pattern between two antenna elements, of the simple antenna shown in FIG. 2a, due to an incident wave transmitted by a transmitter aligned with the center axis of the arrangement of the antenna elements FIG. 3 illustrates the formation of a standing wave pattern between the two antenna elements of FIG. 2b when the transmitter is aligned at a non-zero angle with respect to the center axis of the arrangement of the antenna elements FIG. 4 illustrates a comparison of the standing wave patterns of two antenna element pairs of a Van Atta array with transmitter aligned at a non-zero angle with respect to the center axis of the arrangement of the antenna elements FIG. 5 illustrates another aspect of using a quadrature hybrid as a modulator and parallel diodes for performing detection function FIG. 6 illustrates using a quadrature hybrid and parallel diodes where an incident wavefront is also depicted and a simple biasing network also shown for the parallel diodes arrangement FIG. 7 illustrates using a quadrature hybrid and series diodes and a simple biasing network thereof.

FIG. 1 shows a simple Van Atta array 100 in a one dimensional configuration. The Van Atta array 100 consists of three antenna pairs AB, CD and EF. Each antenna pair consists of two antenna elements arranged symmetrically around a common center 120. The common center 120 is usually a geometrical center of the array. Moreover, since the shown Van Atta array 100 is a one-dimensional array, all antenna pairs are arranged along the same axis 106, which in a relative sense here can be called a horizontal axis 106. Each antenna pair is interconnected with a signal path of a predetermined length. For example, antenna pair AB has antenna elements A and B that are interconnected with their corresponding signal path 101. Similarly, antenna pair CD has antenna elements C and D that are interconnected with their corresponding signal path 102, and antenna pair EF has antenna elements E and F that are interconnected with their corresponding signal path 103.

A signal received by element A is able to propagate towards element B through signal path 101. Similarly, a signal received by element B is able to propagate towards element A through the same signal path 101. Similar functionality applies to each of the antenna pairs CD and EF.

FIG. 1 also shows a transmitter 180 located at the front of the antenna array 100. The transmitter 180 is shown located aligned to the center 120 of the antenna array, and transmitting a series of wavefronts directed towards the antenna arrangement 100. The direction of travel of the wavefronts is shown with an arrow 110, and the wavefront closest to the antenna array is 191. As will be appreciated, the center point of each signal path aligns with the common center 120. If an imaginary perpendicular line 105 would be drawn intersecting the horizontal axis 106 at the at the center point 120, the perpendicular line would also intersect the center of the signal path interconnecting each of the antenna pairs. The perpendicular line 105 is also where the path traced by the direction of travel 110 of the wavefronts from the transmitter 180 intersects the horizontal axis 106. The perpendicular 105 can also be called the normal 105 of the antenna arrangement 110. In the case as shown in FIG. 1, since the transmitter 180 is horizontally aligned with the center 120 of the antenna array 100, the normal 105 coincides with the path of the of travel of the wavefronts towards the antenna arrangement 100—in other words, the imaginary vertical axis or normal 105 when extended or extrapolated towards the transmitter will overlap with the arrow 110. The predetermined lengths 101, 102 and 103 are usually equal, or the electrical length interconnecting elements in each of the antenna pairs is usually the same for an array at least in one of the dimensions of the array. As discussed above, the array shown in FIG. 1 is a one dimensional array, i.e., antenna elements are placed along only one axis or dimension 106. Multi-dimensional arrays are possible where antenna elements are placed along a plurality of axes. As a skilled person will appreciate, the electrical length interconnecting elements in each of the antenna pairs in an antenna array can also be interrelated to the electrical lengths of the other elements of the antenna array by a factor of the wavelength, wherein the factor is an integer number.

FIG. 2a shows a simple antenna arrangement 200 with an antenna pair consisting of elements A and B. The antenna elements A and B are electrically connected by a wire 230 forming the signal path between elements A and B. The signal path between the elements A and B is of length X. The elements A and B are arranged symmetrically around a center point 220. The center point 220 is also the mid-point of the signal path, lying at signal length X/2 away from element A as well as X/2 length away from B. In other words, lengths 215 and 225 are each X/2.

In FIG. 2b, an incident wavefront 201 is shown approaching the antenna arrangement 200 resulting in the formation of a standing wave pattern 202 between two antenna elements A and B. In FIG. 2b, the signal path or wire 230 is not explicitly shown. The wavefront 201 is formed due to an incident wave transmitted by a transmitter aligned with the center axis or normal 205 of the arrangement 200 (aligned as in FIG. 1). The wavefront 201 is transmitted by a transmitter (not explicitly shown in FIG. 2) arranged in such a way that the direction of travel 210 of the incident wavefront 201 is aligned with the center 220 of the antenna arrangement. Since the transmitter is aligned with the center, the normal 205, is aligned relative to the direction 210 of the incident wavefront such that the angle between the direction 210 of travel of incident wavefront 201 and the normal is zero.

The antenna elements A and B are interconnected with the signal path (not directly shown in FIG. 2) such that a signal received by element A propagates through the signal path towards element B. Similarly, a signal received by element B propagates through the signal path towards element A.

Hence, the transmitter in this case located in so called the center front of the antenna arrangement generating a wavefront 201, which is received with equal phase at both the antenna elements A and B, causes the electrical signals to combine and add in phase to a peak value 212 appearing at the center 220 of the signal path. Measurements done at the center point 220 on the signal path will hence read the peak value 212 of the signal 202. Plots 260 and 270 show phase shift along the signal path between elements A and B for signals propagating in opposite direction with respect to each other. The first plot 260 is for the incident signal received by element A and thereafter propagating through the signal path towards element B, whereas the second plot 270 is for the incident signal received by element B and thereafter propagating trough the signal path towards element A.

The peak of the combined signal repeats at an alternating polarity for every half wavelength along the signal path.

For the sake of clarity, it can be mentioned that in reality it is possible to physically form the electrical path or signal path of the antenna pair such that the mid-point of the signal path physically lies at another location with respect to the geometrical center of the antenna array. In such a case the normal of the antenna array will not seem to intersect the mid-point of the signal path. It however does not change the fact that the mid-point of the signal path would lie on the normal of the array had the electrical length been physically symmetrically arranged around the center point of the array. For the sake of simplicity and without any loss of generality it is hence assumed in this disclosure that the mid-points of all signal paths lie essentially on the normal of the array, aligned with the center point. A skilled person will hence clearly understand what is being meant when referring to mid-point or center of a signal path.

Now referring to FIG. 3, which shows the same antenna arrangement, but the direction of travel 310 of the incident wavefront is changed by an angle. The incident wavefront 301 now travels in a direction which is at a non-zero angle 315 relative to the normal 305 of the antenna arrangement. In this case, the transmitter (not explicitly shown in the figure) is offset with respect to the center 220 of the antenna arrangement, the wavefront appears at different phases at the antenna elements, causing the standing wave pattern and to shift accordingly along the signal path. In this case, the maxima of the standing wave pattern have shifted towards element A, relative to the center 220. For example, one of the maxima 312 is shifted towards the left of the center 220, as compared to the maximum 212, which was appearing at the center 220 in case shown in FIG. 2B for an aligned transmitter. In contrast, for the example shown in FIG. 3, the center 220 of the signal path now sees a minimum signal value of the standing wave pattern 302.

Showing this mathematically; given a distance or spacing "S" between the antenna pair, the phase difference of the received signal $d\Phi$ is related to the angle $\theta$ of the incident wave from the equation:

$$d\Phi = S/L \cdot (\sin(\theta)) \cdot 360 \text{ deg}$$

Solving the equation for the antenna spacing of one wavelength (S=L) and an incident wave angle $\theta=30$ deg the phase difference becomes 180 degrees, i.e., the standing wave appears similar, but with an inverted polarity. The direction of travel of the incident wavefront, is hence, tilted at an angle 315 of 30 degrees relative to the normal 305 for the example shown in FIG. 3. It should be mentioned here that spacing between the antenna elements, represented by "S" here not to be confused by the length(s) of the signal path. As an example, assuming that a Van Atta pair is comprised of two antenna elements, for example antenna elements A and B, the signal path length is the length of the signal line or transmission line that connects the two antenna elements in the Van Atta pair, whereas the antenna spacing is the physical spacing between the two elements of the Van Atta pair. The signal path length is usually longer than the antenna spacing.

Assuming that the signal on the signal path is measured as a voltage, the voltage at the center of the signal path will thus change from its maximum to its minimum (or zero in this case) as the incident wave front is shifted from zero to 30 degrees with respect to the center axis. The voltage at the center of the path will thus change from its maximum to zero as the incident wave front is shifted from zero to 30 degrees. This corresponds to cases shown in FIG. 2B and FIG. 3 respectively.

To further clarify with another example, we consider now an antenna arrangement with two pairs of antennas and their associated signal paths; first and second signal paths respectively. Now referring to FIG. 4 that shows such an arrangement or array with two pairs of antenna elements, AB and CD respectively placed along the same axis (not explicitly shown in the figure). Following from the preceding discussion, one can see that an incident wavefront 401 has a direction of travel 410 which is at a non-zero angle with respect to the normal of the antenna array. The antenna elements A and B in the antenna pair AB, form a first Van Atta pair and, are interconnected by the first signal path 431, and the antenna elements C and D in the antenna pair CD, form a second Van Atta pair and, are interconnected by the second signal path 432. The signal paths 431 and 432 have the same electrical length or the signal paths 431 and 432 are interrelated with each other with an integer factor of the wavelength. Considering two signals being measured at points ab and cd on the respective signal paths of AB and CD generated by an incident wave transmitted by a transmitter (transmitter not directly visible in the figure). Signal at ab is measured at the center 220 of the first signal path and signal at cd is measured a half wavelength away from the center of the second signal path, towards the left of the center as shown in the figure. From the preceding discussions, it will be appreciated that point ab is also at geometric center of the array comprising AB and CD antenna pairs. Due to the measurement points ab and cd being half wavelength away relative to each other, the electrical signals at ab and cd will be at their maximum amplitude, but of opposite polarity for the case when the transmitter is aligned with the geometric center of the antenna arrangement, or array—in other words, the angle between the normal and the direction of travel of the wavefront as discussed previously is zero. This case is shown as the first set of plots 470, showing signals ab and cd respectively. If the spacing between elements C and D is twice the spacing between elements A and B and the transmitter is shifted towards the direction of the antenna element B (or D), the signal at cd will shift with twice the phase relative to the phase of signal at ab. At an angle of 30 degrees, the signals at ab and cd will have equal amplitude and polarity, as shown in the third set of plots 472. The second set of plots 471, showing the case when the angle is 14.5 degrees is self-explanatory given the above discussion. It should be mentioned that in this example, the antenna elements A and B in the first Van Atta pair are spaced around one wavelength apart. The antenna elements C and D in the second Van Atta pair are spaced around two wavelengths apart. The wavelength mentioned here is the wavelength of the incident wavefront 401, or of the signal of interest. A person skilled in the art will understand the scope or generality of the present teachings not limited to this specified spacing, and will work even with other spacing values. The expected values for the signal can be calculated, for example, by the incident wave equation presented previously. The array may further have additional Van Atta pairs that are interconnected similarly and measurements performed on the signal paths of the neighboring pairs or between predetermined pairs. The measurements may also be multiplexed, for example, first measuring between the first signal path and the second signal path as previously explained, and then between the first signal path and a third signal path, where the third signal path is that of a third Van Atta pair, and so on. Furthermore, each signal path may have more than one measurement point, for example, the first signal path not only has the measurement point ab, but also at least one more measurement point. Similarly, other signal paths may also have a plurality of measurement points.

According to an aspect of the present teachings, the variability of the standing wave pattern dependent upon the angle of the incident signal is used to modify for the shape of the beam of the antenna.

More specifically, according to another aspect of the present teachings, by coupling at least two pairs of antennas by an equalizing function, the shape of the combined beam may be modified in the way that it becomes slightly suppressed at the front and more amplified at the sides to become more flat. The respective antenna pairs may be connected through an equalizing circuit.

The examples in this disclosure are shown in their simplest sense for ease of explanation, and without limiting the scope or generality of the present teachings. A person skilled in the art will understand that the present teachings can be applied to different types of antenna arrays, for example two-dimensional or multi-dimensional antenna arrays. The present teachings can be applied to any wireless application where an improved directionality is desired.

The equalizing function may be realized, for example, by the mutual coupling between the radiating elements. For two-dimensional antennas, such as circular antennas, the distance between, as well as the individual rotation of the antenna elements may be used to achieve the desired mutual coupling and thus the desired equalizing function. Antennas in vicinity of each other have a mutual coupling (both phase and amplitude) that adds some radiation and thus modifies the shape of the beam of each antenna element.

In another simple implementation, an impedance, for example a resistor is placed between the measurement points or nodes, for example ab and cd. In the case of a resistor for example, energy will be dissipated in the resistor for waves approaching from the center front as the signals are at the maximum value and opposite polarity. No energy will be dissipated for waves at an angle of 30 degrees, i.e., when the two signals across the resistor are having equal amplitudes and polarities.

In another aspect, the measurements are performed on a plurality of nodes on the respective signal paths, either simultaneously, or sequentially. A person skilled in the art will further appreciate that the present teachings are not limited by a specific number or range of antenna pairs or elements, and can be equally well applied to multi-dimensional antenna arrays.

A person skilled in the art understands that said resistor in its simplest sense is meant as an electrical equivalent of any sort of electrical load, or a power sensing circuit. The term resistor is hence used for the sake of simplicity and ease of understanding without affecting the scope of the present teachings. As the skilled person will appreciate, the present teachings go beyond the example of the simple equalizer circuit in terms of a resistor. Other kinds of devices can also be used to realize the equalizing function. For example, in addition to a lossy resistor, essentially lossless circuits as inductors, capacitors, directive- or non-directive couplers, and their likes.

The equalizing circuit may even include a power sensing circuit or a current sensing circuit, said power sensing circuit capable of sensing power transfer between the two measurement points, or in case of a current sensing circuit, the flow of current between the two measurement points. The equalizing circuit may further include a signal processing unit. The signal processing unit may for example be used for performing signal processing functions on the signals measured between the measurement points. Said signal processing functions for example can be, amplification, filtering, averaging, integration, correlation, sampling, signal conversion, etc. At least some of the measurement or signal processing functions can be performed using an Integrated Circuit ("IC") or even an application specific integrated circuit ("ASIC"). The skilled person will also appreciate that the embodiments explained in this disclosure may be combined with each other to realize a wireless device according to specific requirements. Discussion of an embodiment separately does not mean that the embodiment cannot be used with the rest of the examples or embodiments presented herein. Various aspects or embodiments in this disclosure may be combined to build a system according to requirements.

According to another aspect of the present teachings, a directional coupler is used for implementing a modulating as well as a detecting function for an antenna pair. Now referring to FIG. 5 that shows a directional coupler 505, or more specifically a quadrature hybrid, used for coupling antenna elements A and B. Antenna elements A and B form an antenna pair as explained previously. The directional coupler 505 is connected at a desired measurement point on the signal path. The measurement points on the signal paths were discussed previously in this disclosure, for example, in context with FIG. 4. At the desired measurement point, for example point ab in FIG. 4, the signal path can be split with the end of the split signal path connected to the antenna element A connected at port a of the coupler, and similarly, the other end of the split signal path, connected to the antenna element B, is connected to the port b of the coupler. When performing a modulation function, an incoming signal, or a signal input at port a is split into two signals, being output at ports x and y respectively, the signals at the latter ports, x and y, being 90 degree phase shifted relative to each other and half the power (0.707 voltage). As these signals are reflected by the two essentially equally biased diodes 501 and 502 connected at ports x and y, the signal is canceled at port a and recombined at port b. Similarly, a signal input at port b is split into two signals, being output at ports y and x respectively, the signals at the latter ports, y and x, being 90 degree phase shifted relative to each other and half the power (0.707 voltage). As these signals are reflected by the two essentially equally biased diodes 502 and 501 connected at ports y and x, the signal is canceled at port b and recombined at port a. The transfer function generated by a typical diode characteristic is plotted also in the figure, showing the effect of diode series resistance and series inductance for the high current bias (low impedance) condition, e.g., the 10 mA point on the plot, and the parallel capacitance and parallel resistance for low current (high impedance) condition, e.g., the 0.1 mA point on the plot.

This modulation transfer function is bi-directional, and thus works for signals both received and transmitted by a and b ports, thereby improving the retro-directive performance.

A single antenna pair is discussed here for simplicity, but as it will be appreciated, a separate directional coupler can be used similarly for each of the other antenna pairs in the array, with the respective antenna pairs having directional couplers connected at the predetermined measurement points.

The application of a quadrature hybrid for realizing a detection function is shown further in FIG. 6. As a detector, a diode is typically biased at low current to improve the sensitivity. The isolation between the ports a and b is still valid, and the signals received by A and B in a Van Atta pair will combine at the hybrid outputs x and y. An incident wave aligned at the center front will appear at equal phase at a and b, and thus combine to two equal signals at x and y. For an incident wave offset from the center front, the phase of a and b will differ, and the signals at x and y will combine differently. For this example also, the elements A and B are placed one wavelength apart.

FIG. 6 (B) further shows how signals combine equally for 0 degrees and only combine at one output when they are 90 degree phase shifted. To clarify how the signals split and/or combine, plot B1 shows the case when signal is only input at port a, in this case, the signal input at port a will be split equally and appear at ports x and y with signals at x and y being 90 degrees phase shifted with respect to each other. Similarly B2 shows the case for a signal at port b only in which case, the signal is again split between x and y and with 90 degrees phase shift, however the polarity of x and y signals is opposite to that in case of B1. In B3, equal signals are applied in phase at ports a and b, resultant upon which the signals at x and y are of same polarity. In B4, signals a and b are equal, but 90 degrees phase shifted as a result of which, signal at port x is canceled but appears recombined at port y. In this case, B4, the power of a and b adds for the voltage to become around 1.41 times the voltage of signals at a and b. This causes the sensitivity of the detector to increase as the incident wave shifts to the side, and thus compensates for the signal loss caused by the lobe-width of the elements. A person skilled in the art will understand that the diodes may be connected in parallel as shown, or alternatively in series. In the parallel configuration, as shown in FIG. 6, the diode which receives the strongest signal will dominate and drive the bias signal of its own by its rectified voltage. In a series type connection, the diodes will add their rectified voltages. An example of a simple biasing network is shown in FIG. 6(C), where a biasing current 605 is supplied to coils 601 and 602, where the first coil 601 supplies bias to the first diode 501, and the second coil 602 supplies bias to the second diode 502. Under nominal conditions, when the circuit is balanced, if the biasing current 605 has a value $2*i_o$, then each of the coils 601 and 602 will be carrying bias current of value $i_o$. A skilled person will understand the function of the coils 601 and 602, which is to block AC signals.

FIG. 7 shows an example of the series connection of the diodes. Series biasing current 701 is now fed through the first coil 601 where the series biasing current flows through the first diode 501, then through the second diode 502 before flowing through the second coil 602.

According to another aspect of the present teachings the quadrature hybrid is used both as a modulator and as a detector, thereby reducing the number of components and the complexity. This may also be used to achieve an increased angle of the effective antenna-lobe.

Directional couplers, also including quadrature couplers, and their implementations power splitters and power combiners, etc., are well known in the field of RF- and microwave technology. A person skilled in dealing with electromagnetic signal transmission and transmission lines will be aware of these terms and will understand that the present teachings can be applied to other devices with similar function, without the scope or generality of the present teachings being affected due to use of any specific terms in this disclosure.

To summarize, the present teachings relate to a wireless device comprising a Van Atta array. Said Van Atta array comprises a plurality of antenna pairs, each of said antenna pairs comprises two antenna elements. The antenna elements in each antenna pair are electrically coupled by a signal path of a predetermined electrical length. The signal path of each of said antenna pairs is having a center point around which the two electrically coupled antenna elements are symmetrically arranged.

The wireless device further comprises a measurement unit, said measurement unit is adapted to perform electrical measurements between two measurement points. The first, or one of said two measurement points being located at a first predetermined location on the signal path of one of the antenna pairs. The second, or the other of said two measurement points is located on a second predetermined location. The second predetermined location is on the signal path of one of the other antenna pairs. The first predetermined location and the second predetermined location are at non-equal signal lengths from the center point of their respective signal paths, or the first predetermined location and the second predetermined location are at different distances from the center point of their respective signal paths.

In alternative words, the present teachings also relate to a wireless device comprising two Van Atta pairs. Each Van Atta pair comprises two antenna elements electrically coupled by a signal path of a predetermined length. A first terminal of a measurement unit is connected to a first signal path at a first predetermined location on the first signal path. The first signal path is the signal path connecting the two antenna elements of the first Van Atta pair. A second terminal of the measurement unit is connected to a second signal path at a second predetermined location on the second signal path. The second signal path is the signal path connecting the two antenna elements of the second Van Atta pair. The measurement unit is adapted to perform measurements between the first terminal and the second terminal.

The measurements performed by the measurement unit are preferably of relative or differential in nature, i.e., measuring a first signal at the first terminal, and a second terminal at the second terminal, and then generating a third signal. The third signal being related to the first signal and the second signal.

The third signal is preferably dependent upon the difference between the first signal and the second signal. Measurement done by the measurement unit is preferably flow of current between the first predetermined location and the second predetermined location.

By saying that the measurement unit is adapted to perform electrical measurements between two measurement points does not necessarily mean that the measurement unit must physically measure the first signal at the first predetermined location and then measure the second signal at the second predetermined location to generate the third signal. It preferably means that the measurement unit by virtue of its connection between the first predetermined location and the second predetermined location, or inherently, is able to generate the third signal that is dependent upon the first signal and the second signal. Such a terminology, i.e., the measurement unit is adapted to perform electrical measurements between two measurement points is chosen to encompass both the case of separate and inherent measurements as explained for a broad scope of protection.

The term Van Atta array should not be considered limiting to the scope or generality of the present teachings. Other symmetrical arrays where the present teachings can be applied are also considered included within the ambit of the claims.

In one embodiment, the measurement unit comprises a resistor or resistance. The resistance can even be an equivalent resistance, for example that of a semiconductor device or input of an amplifier or any other suitable signal processing block. The resistor or equivalent resistance is used for performing at least some of said electrical measurements between the two measurement points. In other embodiment, the measurement unit is capable of measuring current between at least two measurement points. One of said at least two measurements points being the first predetermined location, and another of said at least two measurements points being the second predetermined location. In other embodiment, the measurement unit is capable of measuring the power flow between the at least two measurement points.

The measurement unit can also be adapted to perform single-ended measurements, i.e., measuring the first signal or the second signal alone. The wireless device may further comprise additional Van Atta pairs, and the measurement unit further being adapted to measure signals at predetermined locations on the signal paths of at least some of the additional Van Atta pairs. The measurement unit may perform the measurements either in parallel, or in sequence, or even perform multiplexing, or sampling or such. The measurement unit may combine such measurements as required.

According to another embodiment, the measurement unit is also adapted to perform an equalizing function.

According to yet another embodiment, the measurement unit is also adapted to perform a detection function.

According to another embodiment, the measurement unit is also adapted to perform a modulating or modulation function.

According to another embodiment, the measurement unit comprises at least one directional coupler. In a preferred embodiment, at least one of the at least one directional couplers is a quadrature hybrid.

According to another embodiment, the measurement unit comprises at least one diode. Preferably, at least one of the said one diodes is used for performing at least a detection function.

In yet another embodiment, a first port of the quadrature hybrid is coupled to the first antenna element of one of the antenna pairs of the Van Atta array, the second port of the quadrature hybrid is coupled to the second antenna element of the one of the antenna pairs of the Van Atta array. The wireless device further comprises a first diode and a second diode, the first diode being coupled to the third port of the quadrature hybrid, and the second diode being coupled to the fourth port of the quadrature hybrid.

The present teachings also relate to a method for retro-reflection of an incident wave using a plurality of antenna pairs, wherein the steps performed in at least two of the antenna pairs in said plurality of antenna pairs are comprised of:

Receiving an electromagnetic or RF wave incident at the plurality of antenna pairs, resulting in a first received signal in a first antenna pair, and a second received signal in a second antenna pair, said first antenna pair and said second antenna pair being amongst said plurality of antenna pairs;

Measuring a first electrical signal at a first position on the signal path of the first antenna pair;

Measuring a second electrical signal at a second position on the signal path of the second antenna pair;

Generating a third signal by combining the first electrical signal and the second electrical signal;

Using the third signal for finding the angle of travel the incident wave with respect to a reference line.

The first position is at a first distance from the center point of the signal path of the first antenna pair. The second position is at a second distance from the center point of the signal path of the second antenna pair. The second distance is preferably different from the first distance, or the second distance is non-equal to the first distance.

The reference line is preferably the normal of the plurality of antenna pairs, but it can also be any other fixed reference line or plane.

The third signal is preferably indicative of the phase difference between the first signal and the second signal.

According to another embodiment, the method further comprises the step:

Using the third signal for performing a modulation function.

According to another embodiment, the method further comprises the step:

Using the third signal for performing an equalizing function.

Again, by saying,

Measuring a first electrical signal at a first position on the signal path of the first antenna pair;

Measuring a second electrical signal at a second position on the signal path of the second antenna pair;

does not necessarily mean that the first signal and the second signal must be physically measured at the first predetermined location and the second predetermined location to generate the third signal. It preferably means that the third signal is inherently generated dependent upon the first signal and the second signal according to the preferred embodiment. Such a terminology, is chosen to encompass both the case of separate and inherent measurements as explained for a broad scope of protection.

The invention claimed is:

1. A wireless device comprising:
   a Van Atta array, the Van Atta array comprising a plurality of antenna pairs;
   each of the antenna pairs comprising two antenna elements electrically coupled by a signal path of predetermined length;
   the signal path of each of the antenna pairs having a center point around which the two electrically coupled antenna elements are symmetrically arranged, wherein the wireless device further comprises a measurement unit, the measurement unit adapted to perform electrical measurements between two measurement points, one of the two measurement points being located at a first predetermined location on the signal path of one of the antenna pairs, and the other of the two measurement points being located on a second predetermined location on the signal path of one of the other antenna pairs;
   wherein the measurement unit comprises a directional coupler;
   wherein the directional coupler is a quadrature hybrid; and
   wherein a first port of the quadrature hybrid is coupled to a first antenna element of one of the antenna pairs of the Van Atta array, a second port of the quadrature hybrid is coupled to a second antenna element of the one of the antenna pairs of the Van Atta array, and wherein the wireless device further comprises a first diode and a second diode, the first diode being coupled to a third port of the quadrature hybrid, and the second diode being coupled to a fourth port of the quadrature hybrid.

2. The wireless device according to claim 1, wherein the first predetermined location and the second predetermined location are at non-equal signal lengths from the center point of their respective signal paths.

3. The wireless device according to claim 1, wherein the measurement unit is adapted to perform an equalizing function.

4. The wireless device according to claim 1, wherein the measurement unit is adapted to perform a detecting function.

5. The wireless device according to claim 1, wherein the measurement unit is adapted to perform a modulating function.

6. The wireless device according to claim 1, wherein the measurement unit comprises at least one diode.

7. The wireless device according to claim 1, wherein the measurement unit comprises a resistor or an equivalent resistance used for performing at least some of the electrical measurements between the two measurement points.

8. A method for retro-reflection of an incident wave using a plurality of antenna pairs, wherein the steps performed in at least two of the antenna pairs in the plurality of antenna pairs, the method comprising:
   receiving an electromagnetic wave incident at the plurality of antenna pairs, resulting in a first received signal in a first antenna pair, and a second received signal in a second antenna pair, the first antenna pair and the second antenna pair being amongst the plurality of antenna pairs;
   measuring a first electrical signal at a first position on the signal path of the first antenna pair, the first position being at a first distance from the center point of the signal path of the first antenna pair;
   measuring a second electrical signal at a second position on the signal path of the second antenna pair, the second position being at a second distance fron the center point of the signal path of the second antenna pair; the second distance being non-equal to the first distance;
   generating a third signal by combining the first electrical signal and the second electrical signal; and
   using the third signal for finding the angle of travel the incident wave with respect to a reference line.

9. The method according to claim 8, wherein the third signal is further indicative of the phase difference between the first signal and the second signal.

10. The method according to claim 8, the method comprising using the third signal for performing a modulation function.

11. The method according to claim 8, the method comprising using the third signal to perform an equalizing function.

* * * * *

UNITED STATES PATENT AND TRADEMARK OFFICE
CERTIFICATE OF CORRECTION

PATENT NO. : 11,152,698 B2
APPLICATION NO. : 16/477972
DATED : October 19, 2021
INVENTOR(S) : Steffen Kirknes It is certified that error appears in the above-identified patent and that said Letters Patent is hereby corrected as shown below:

In the Claims

Column 12, Claim 8, Line 48    Replace "at a second distance fron the" with
-- at a second distance from the --

Signed and Sealed this
Thirty-first Day of May, 2022

Katherine Kelly Vidal
*Director of the United States Patent and Trademark Office*